US 7,734,739 B2

(12) United States Patent
Natarajan et al.

(10) Patent No.: US 7,734,739 B2
(45) Date of Patent: Jun. 8, 2010

(54) METHOD AND SYSTEM FOR CONSOLIDATING NETWORK TOPOLOGY IN DUPLICATE IP NETWORKS

(75) Inventors: Srikanth Natarajan, Fort Collins, CO (US); Darren D. Smith, Lafayette, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2015 days.

(21) Appl. No.: 09/838,239

(22) Filed: Apr. 20, 2001

(65) Prior Publication Data

US 2002/0156883 A1 Oct. 24, 2002

(51) Int. Cl.
*G06F 15/177* (2006.01)
*G06F 15/173* (2006.01)
*H04L 12/28* (2006.01)

(52) U.S. Cl. .................. 709/221; 709/224; 370/254
(58) Field of Classification Search ................ 709/224, 709/221; 345/734–736; 370/254
See application file for complete search history.

(56) References Cited

U.S. PATENT DOCUMENTS

| | | | | |
|---|---|---|---|---|
| 5,448,727 A | * | 9/1995 | Annevelink | 707/101 |
| 5,577,252 A | * | 11/1996 | Nelson et al. | 718/100 |
| 5,787,252 A | * | 7/1998 | Schettler et al. | 709/224 |
| 5,793,974 A | * | 8/1998 | Messinger | 709/224 |
| 5,948,055 A | | 9/1999 | Pulsipher et al. | |
| 5,968,121 A | * | 10/1999 | Logan et al. | 709/219 |
| 6,041,349 A | * | 3/2000 | Sugauchi et al. | 709/223 |
| 6,076,114 A | * | 6/2000 | Wesley | 709/235 |
| 6,119,171 A | * | 9/2000 | Alkhatib | 709/245 |
| 6,125,447 A | * | 9/2000 | Gong | 713/201 |
| 6,167,052 A | * | 12/2000 | McNeill et al. | 370/399 |
| 6,343,064 B1 | * | 1/2002 | Jabbarnezhad | 370/216 |
| 6,405,248 B1 | * | 6/2002 | Wood | 709/223 |
| 6,408,336 B1 | * | 6/2002 | Schneider et al. | 709/229 |
| 6,425,007 B1 | * | 7/2002 | Messinger | 709/224 |
| 6,430,613 B1 | * | 8/2002 | Brunet et al. | 709/223 |
| 6,457,053 B1 | * | 9/2002 | Satagopan et al. | 709/226 |
| 6,574,633 B1 | * | 6/2003 | Jamalabad et al. | 707/102 |
| 6,665,715 B1 | * | 12/2003 | Houri | 709/223 |
| 6,697,851 B1 | * | 2/2004 | Althaus et al. | 709/220 |

(Continued)

FOREIGN PATENT DOCUMENTS

WO   WO00/49769   8/2000

OTHER PUBLICATIONS

Hwa-Chun Lin; Shou-Chuan Lai; Ping-Wen Chen; "An algorithm for automatic topology discovery of IP networks" Communications, 1998. ICC 98. Conference Record.1998 IEEE International Conference on , vol. 2 , Jun. 7-11, 1998 pp. 1192-1196 vol. 2.*

(Continued)

*Primary Examiner*—Peling A Shaw
*Assistant Examiner*—William Vaughn

(57) ABSTRACT

A method and system are described for managing a computer network. In accordance with exemplary embodiments of the present invention, a collection computer is assigned a management domain identifier uniquely associated with a management domain in which each collection computer resides. Information that includes the management domain identifier is received in at least one management computer from the collection computer. A database of the information accessed using the management domain identifier is maintained within the at least one management computer.

8 Claims, 5 Drawing Sheets

U.S. PATENT DOCUMENTS 6,854,016 B1 * 2/2005 Kraenzel et al. ............ 709/229
2002/0156882 A1 10/2002 Natarajan et al.

OTHER PUBLICATIONS

Bannerman, S.; Stockdell, B.; Stutz, M.; "Network topology configuration management experience report" Telecommunications Information Networking Architecture Conference Proceedings, 1999. TINA '99, Apr. 12-15, 1999 pp. 137-139.*

GB Search Report for Appln. No. GB 0208167.7 dated Sep. 18, 2002 1 page submitted.

* cited by examiner

METHOD AND SYSTEM FOR CONSOLIDATING NETWORK TOPOLOGY IN DUPLICATE IP NETWORKS

BACKGROUND

1. Field of the Invention

The present invention relates to computer networks. More particularly, the present invention relates to consolidating network topologies in duplicate Internet Protocol (IP) networks.

2. Background Information

Management stations connected to a network are often configured by a management software package to discover the network topology, for example, the network nodes and node interconnections. From the network topology, the station constructs a network management map, which comprises a collection of various sub-maps. Each sub-map corresponds with a different view of the network and any sub-map can be displayed on a display device. These sub-maps can be arranged in a hierarchy.

For example, a network management map implemented in the known "OPENVIEW"™ management software, commercially available from the Hewlett-Packard Company, U.S.A., has a root sub-map defined at a root level representing the highest logical level sub-map in the hierarchy and shows objects acting as anchor points for different sub-map hierarchies, each hierarchy being a separate management domain, for example, a network, logical grouping of nodes, or some other domain. An Internet sub-map is defined at an Internet level and is generated by exploding an object (i.e., providing more data regarding the object) within the root sub-map. This process of exploding can be iteratively repeated to any desired level of detail.

Hewlett-Packard's "OPENVIEW"™ Network Node Manager (NNM) product, for example, maintains a network topology data of all the network elements that it knows of or discovers. The topology is populated by various techniques, such as discovery of network elements, manual addition of network elements by the end user and by collection of topology information sent by other NNM stations, known as collection stations. Collection stations send their data to another NNM station known as the management station. When a NNM management station receives data concerning a network element with an Internet Protocol (IP) address as a part of topology data from a collection station, it determines if some other collection station also reported the same IP address for a network element. If so, the NNM management station makes one network element a primary element and the other a secondary element. Management station-collection station concepts are discussed in, for example, U.S. Pat. No. 5,948,055 (Pulsipher et al.), the disclosure of which is hereby incorporated by reference in its entirety.

In managing computer networks, difficulties can arise when different networks use identical (duplicate) IP addresses. A duplicate IP address can be a repeated IP host/interface address, a repeated hostname, or a repeated network name or address. Duplicate IP addresses can occur when different companies use the same private or unregistered IP addresses. Duplicate IP addresses can also occur as a result of, for example, improperly configured network devices in which network elements in the same collision domain are communicating with the same IP address or two network nodes have the same hostname. Duplicate IP addresses can also occur as a result of stand-by router configurations (where the router and its stand-by use the same IP address).

A problem arises when a network manager deploys collection stations (which are remotely-located collection computers reporting back to one or more central management stations) at different customer sites having duplicate IP addresses, because network management products use IP addresses as a key in their databases. For example, two network elements with the same IP address cannot be stored in a single topology with these products. For example, NNM cannot store elements with the same IP address from different customers as primary elements, even when they are actually unique network elements.

A known technique for consolidating duplicate IP addresses into a single network topology involves displaying networks of different companies in a single console window, but separating them within that window in different customer containers based on the originating collection computer. However, this technique does not provide the network manager with a consolidated network topology of all the customer networks that the network manager is managing, as the topology of each collection computer is displayed individually.

It would be desirable to provide an improved method to consolidate network topology data having duplicate IP addresses occurring across companies.

SUMMARY OF THE INVENTION

A method and system are described for managing a computer network. In accordance with exemplary embodiments of the present invention, a collection computer is assigned a management domain identifier uniquely associated with a management domain in which each collection computer resides. Information that includes the management domain identifier is received in at least one management computer from the collection computer. A database of the information accessed using the management domain identifier is maintained within the at least one management computer.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
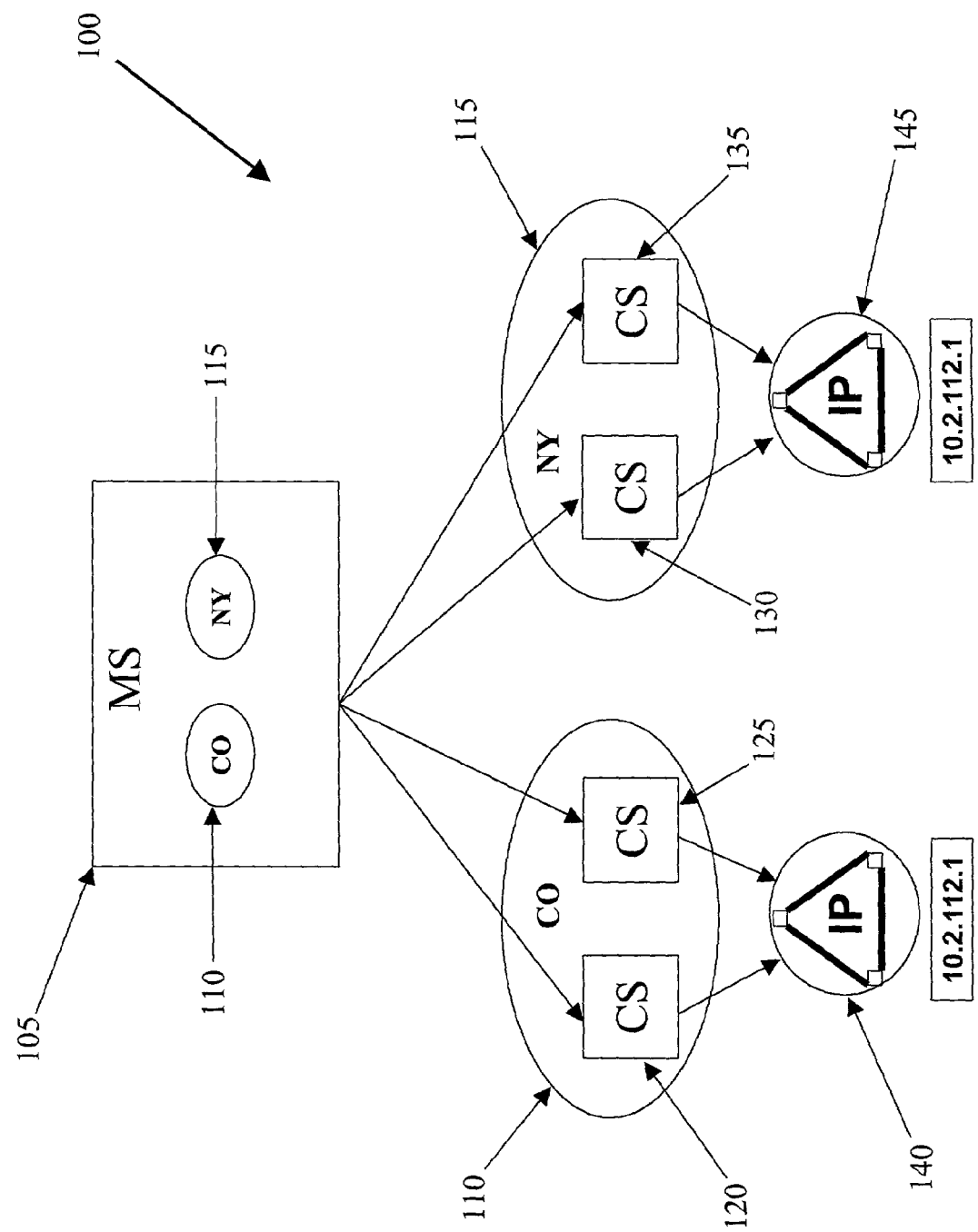
FIG. 1 is a block diagram illustrating a network topology for managing a computer network in accordance with an exemplary embodiment of the present invention.

FIG. 1 is a block diagram illustrating a network 100 that is managed in accordance with an exemplary embodiment of the present invention. According to an exemplary embodiment of the present invention, network 100 can include a plurality of collection computers, wherein each collection computer is assigned a management domain identifier uniquely associated with a management domain in which each collection computer resides. In an exemplary embodiment of the present invention, the collection computers can be, for example, collection stations 120, 125, 130, and 135. Network 100 can also include at least one management computer for receiving information, from the plurality of collection computers, that includes the management domain identifier. In an exemplary embodiment of the present invention, the management computer can be, for example, management station 105. Network 100 can also include at least one computer database for maintaining within the at least one management computer information accessed using the management domain identifier. Collection stations and management stations are described in, for example, U.S. Pat. No. 5,948,055.

As shown in FIG. 1, collection stations can be deployed to monitor computer networks within, for example, remote customer sites. In FIG. 1, collection stations 120 and 125 have been deployed to monitor a first computer network (e.g., a customer site designated as "CO"), while collection stations 130 and 135 have been deployed to monitor a second computer network (e.g., a customer site designated as "NY"). In FIG. 1, each of the first and second computer networks, respectively, can be connected to at least one management station, for example, management station 105.

Within the first computer network, a first network element 140 is designated by any IP address, for example, "10.2.112.1", that is unique within first computer network 140. Within second computer network 145, a second network element is designated by any IP address, for example, "10.2.112.1", that is unique within second computer network 145. However, in FIG. 1, between first computer network 140 and second computer network 145, the designated IP address of, for example, "10.2.112.1" is not unique. Thus, as can be seen in FIG. 1, collection stations have been deployed at different customer sites, where the different customer sites have duplicate IP addresses between them. However, those of ordinary skill will recognize that different customer sites can have not only duplicate IP addresses between them, but also duplicate network names and duplicate hostnames.

Figure 2:
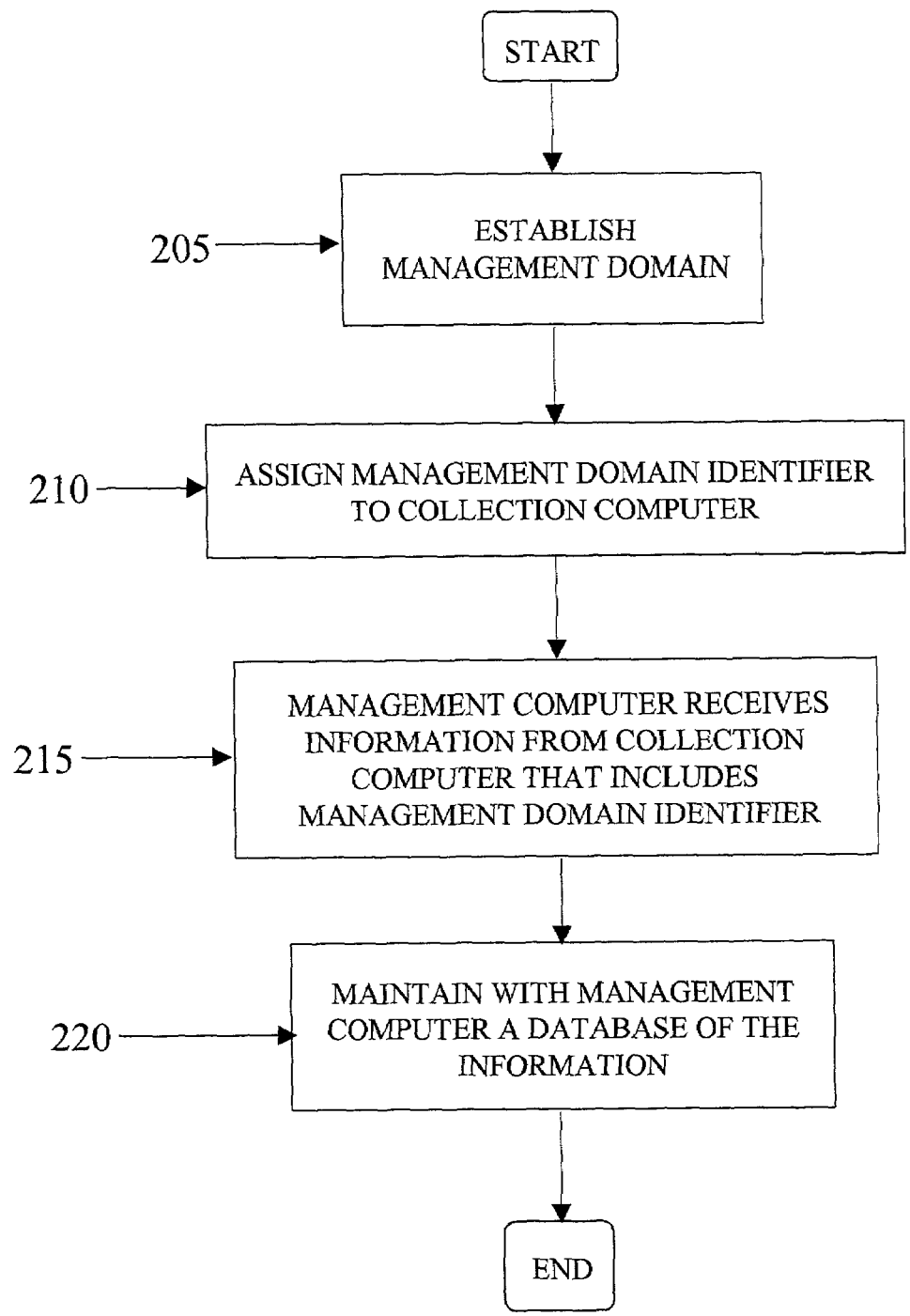
FIG. 2 is a flow chart showing the steps for managing a computer network in accordance with an exemplary embodiment of the present invention.

To address the existence of duplicate network addresses, duplicate network names, and duplicate hostnames across different computer networks, an exemplary method for managing a computer network will be described with reference to FIG. 2. In step 210, a collection computer can be assigned a management domain identifier uniquely associated with a management domain in which the collection computer resides. According to an exemplary embodiment of the present invention, a management domain is a network within which IP addresses, network names, and hostnames are unique. Accordingly, IP addresses, network names, and hostnames can repeat across management domains. In step 205, at least one management domain can be established, wherein each management domain can include at least one collection computer.

In the exemplary embodiment shown in FIG. 1, the collection stations monitoring first computer network 140 can be designated as a first management domain 110. First management domain 110 can include, for example, collection stations 120 and 125. In addition, the collection stations monitoring second computer network 145 can be designated as a second management domain 115. Second management domain 115 can include, for example, collection stations 130 and 135. To differentiate between management domains, a management domain identifier is uniquely associated with each management domain. According to an exemplary embodiment, the management domain identifier can be, for example, the domain name of the management domain. For example, the management domain identifier for collection stations 120 and 125 corresponding to management domain 110 would be "CO". The management domain identifier for collections stations 130 and 135 corresponding to management domain 115 would be "NY". However, any management domain identifier which uniquely identifies a management domain can be associated with each management domain. Consequently, different management domain identifiers can be assigned to the collection stations monitoring networks of different customers, and the same management domain identifiers can be assigned to the collection stations monitoring the networks of the same customer.

In step 215, at least one management computer (e.g., management station 105) receives information from the collection computers (e.g., collection stations 120, 125, 130, and 135) that is gathered while monitoring the collection computers' respective computer networks. The information received at the management station from the collection computers can be network topology information that includes the management domain identifier of the management domain in which the collection computer resides.

In step 220, a database of the information received at the at least one management computer can be maintained within the at least one management computer. The information, such as, for example, network topology information, can be accessed using the management domain identifier included with the information. Thus, the management domain identifiers can be used to consolidate network topology information from collection computers having identical network addresses and belonging to different management domains. The consolidated network topology can be, for example, displayed to an operator on the management computer, such as, for example, management station 105 or any other computer display device.

As shown in FIG. 1, management domains 110 and 115 can be simultaneously displayed to an operator through the management computer as a consolidated network topology. Since management domains 110 and 115 correspond to different domains (e.g., customer sites), management domains 110 and 115 are not merged in the consolidated topology displayed to an operator. However, the information received from collection computers contained within a management domain can be merged. For example, the information from collection stations 120 and 125 can be merged in management domain 110 and the information from collection stations 130 and 135 can be merged in management domain 115. Consequently, an operator can view the merged information from the collection computers within each management domain in a single, merged topology through the management computer (e.g., management station 105), and the operator can also view the consolidated topology across management domains through the management computer (e.g., management station 105), even though IP addresses are duplicated across management domains. As used herein, "merging" can refer to the consolidation of network topology within a management domain, whereas "consolidation" can refer to the consolidation of network topology across management domains. Merging and displaying a network topology to an operator is discussed, for example, in U.S. Pat. No. 5,948,055.

In FIG. 1, collection stations 120 and 125 can each monitor first computer network 140 having a first network element, and collection stations 130 and 135 can each monitor second computer network 145 having a second network element. Because two collection stations can monitor the same computer network, overlapping coverage of network elements by collection stations within a management domain can cause duplicate IP addresses to be reported to a management station. As discussed previously, when a management station receives duplicate IP addresses, it can attempt to assign a network element reported from one collection station as a primary network element and the network element reported from the other collection station as a secondary network element.

Figure 3:
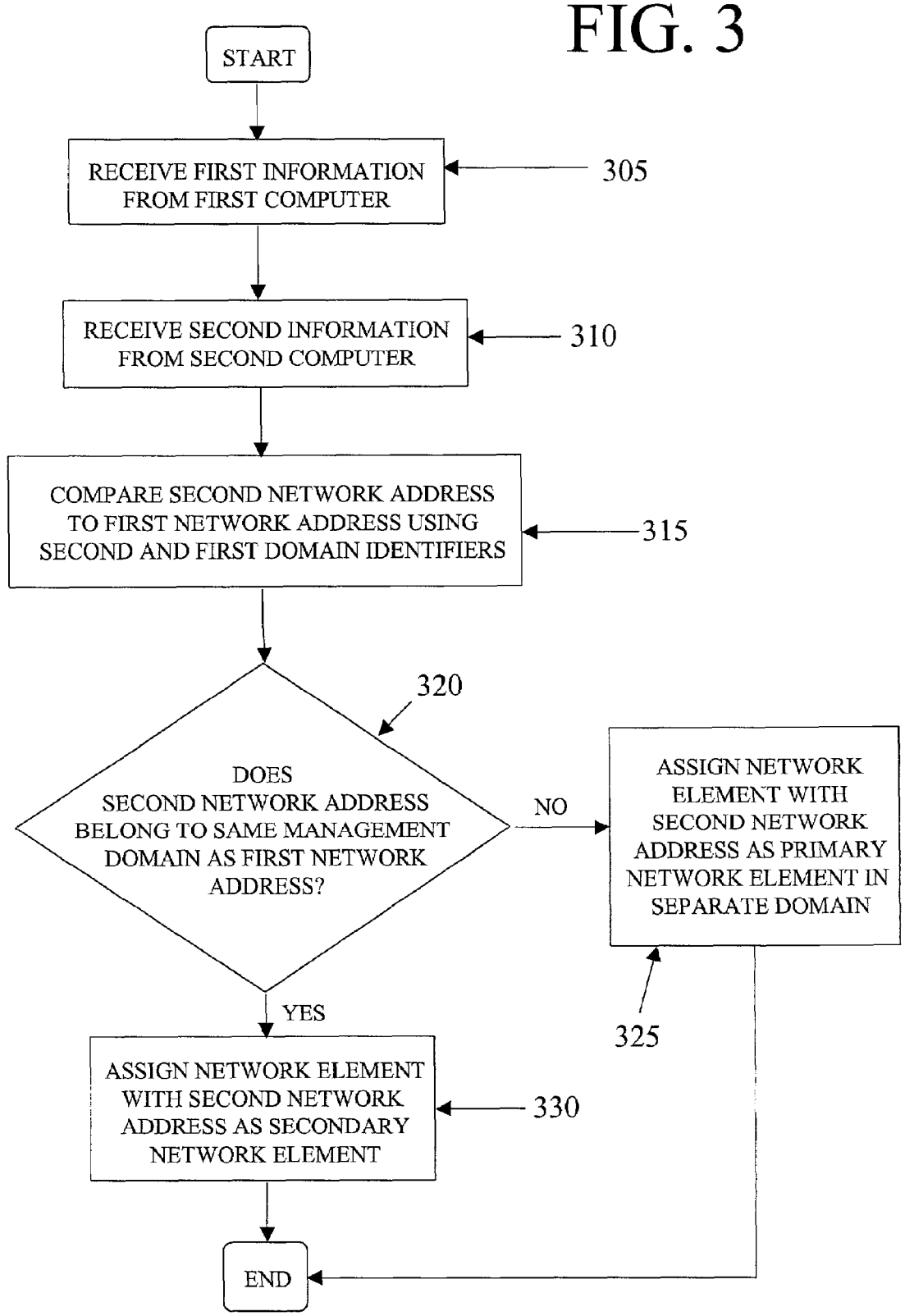
FIG. 3 is a flow chart showing the steps for determining primary and secondary network addresses in accordance with an exemplary embodiment of the present invention.

An exemplary method for determining the primary and secondary nature of network elements based on network addresses (e.g., IP addresses) across management domains in a computer network will be described with reference to FIG. 3. In step 305, at least one management computer can receive first information from a first collection computer, wherein the first information includes a first network address and a first management domain identifier. In step 310, the management computer can receive second information from a second collection computer, wherein the second information includes a second network address and a second management domain identifier. The second network address can be identical to the first network address. In step 315, the management computer can compare the second network address to the first network address using the second management domain identifier and the first management domain identifier. Based on the results of the comparison in step 320, in step 325 the management computer can assign the network element associated with the second network address as a primary network element when the second network address belongs to a different management domain than the first network address. Alternatively, in step 330 the management computer can assign the second network element associated with the second network address as a secondary network element when the second network address belongs to the same management domain as the first network address.

In an exemplary embodiment of the present invention, when management station 105 receives an IP address as a part of topology data from a collection station, management station 105 can check to determine whether some other collection station also reported the same IP address. If so, management station 105 designates one network element with that IP address as the primary network element and the other network element as the secondary network element. Thus, to determine whether a network element is primary or secondary, management station 105 can use the management domain identifier to determine whether the network element with the received IP address belongs to the same domain as the duplicate IP address or not. If the network element does belong to the same domain, then the network element is a secondary network element, otherwise the network element is designated as a primary network element.

In the distributed Internet monitoring system ("DIMS") described in U.S. Pat. No. 5,948,055, data is represented in the form of structures referred to as "topology objects" or "objects." Topology objects are the internal representation of real world objects, and the term is used to refer both to the organization of the data as well as to the internal structures used to track that data. For example, for a given computer (node) in the real world, the DIMS will track a body of data about that node. That data is stored in a form that models that node in a topology database that resides within a management station. Additionally, a topology manager running within a management station and the applications that deal with it will read that data into an internal structure that represents that node's data, and that internal structure is referred to as a "topology node object" or just a "node."

In the DIMS, each topology manager can track the following types of objects: (a) a node object that represents the computers and connective devices in a network; (b) an interface object that represents the logical connections of the node to various networks; every interface must be associated with a node, and a node may have zero or more interfaces; (c) a segment object that represents a physical cable to which nodes are attached via interfaces; a segment conceptually contains those nodes which have interfaces connected to the segment; (d) a network object that represents a logical IP network; (e) the network object conceptually contains several segments and the nodes that are connected to those segments; (f) a global Internet object that contains global information and conceptually contains all other objects; and (g) a station object that represents a remote node that is acting as a host for the collection station software; a station object conceptually contains all the objects that are reported by that collection station's topology manager.

Each type of object can have a unique type of "name" field that is used to identify it. For example, networks have an "IP Network Name" that is based on the IP subnet address and subnet mask of the network. Segments can have an "IP Segment Name" that can be composed of the name of the network that contains the segment, and the word "segment" with a unique number after it. Nodes can have an "IP Hostname" that can be based on the official IP hostname of the node, while each interface can have an IP address. Each object has multiple types of identifiers (IDs). First, each individual object has a "universal unique identifier" (UUID). The UUID is basically a string that is guaranteed to be unique across multiple collection computers. Additionally, each object has associated with it a local identifier called the "local object ID". This identifier is an integer for use within a collection computer. In DIMS, when multiple versions of an object are reported with the same name field, they should all map to the same local object ID. For example, a collection computer can be represented by the following topology node object in the DIMS:

STATION NAME: husker.cnd.hp.com
    STATION ID: 1015
    STATION UUID: 0736345a-8a65-71d4-0166-0f0276210000
    CREATE TIME: Thu Sep 14 11:32:41 2000
    MODIFY TIME: Thu Sep 14 11:32:41 2000
    SYMBOL CHANGE TIME: Thu Sep 14 11:32:41 2000
    LABEL CHANGE TIME: Thu Sep 14 11:32:41 2000
    STATUS: Normal
    LAST STATUS CHANGE: Thu Sep 14 11:32:41 2000
    FLAGS: LOCAL_STATION
    LAST FLAGS CHANGE: Thu Sep 14 11:32:41 2000
    DATABASE CREATION TIME: 0 (unset)
    STATION EVENT NUMBER: 0
    STATION TYPE: Unknown
    STATION VERSION: 0
STATION LICENSE EXPIRATION DATE: 0 (unset)
    STATION LICENSED NODES: 0
    STATION MANAGED NODES: 0
    STATION ACCESS MODE: Read-Write
    STATION OVERLAP MODE: DeleteSecondary
    STATION CHECK INTERVAL: 5 minutes In an exemplary embodiment of the present invention, two additional fields, for example, can be added to the topology node object: a management domain identifier and a trust name flag. The management domain identifier can be, for example, an attribute of the collection station object and the trust name can be, for example, a single bit flag in the collection station object. If no management domain identifier is specified, the management station can assign the collection station a management domain identifier, such as, for example, "Default." The trust name flag can be used by the management station to determine whether or not the hostname is name trustworthy, i.e., whether or not to use or trust the hostname being reported by the collection station. Thus, if the trust name flag is set to, for example, one, then the hostname of the network element as reported from the collection station will be used as the name of the network element, otherwise it will be recomputed at the management station based on, for example, the IP address of the interfaces associated with the network element or node.

In accordance with an exemplary embodiment of the present invention, a field name, such as, for example, "DOMAIN NAME" can be added to the collection station object, and the "FLAGS" field can reflect whether, for example, the "TRUSTNAME" is set or not for the collection station. Thus, the above-described exemplary topology node object could be modified as follows:

DOMAIN NAME: domainA
FLAGS: LOCAL_STATION TRUSTNAME

In this exemplary embodiment, "domainA" is the management domain identifier of a collection station and "TRUSTNAME" represents a value of, for example, one for the trust name flag.

In NNM, for example, the command used to configure a station as a collection station is the "xnmtopoconf" command. This command takes numerous options, including the "-add" option. In accordance with an exemplary embodiment of the present invention, for assigning management domains to collection stations and for configuring collection stations as name trustworthy, the add option can be modified to accept two additional options: "-domain<domain name>" and "-trustname", respectively. In using these commands, the "<domain name>" is the name of the management domain that is to be assigned to the collection station. If "-trustname" is specified as part of the command, then the hostname being reported by the collection station will be trusted and used to name a network element. In an exemplary embodiment, when "-trustname" for a station is set, the xnmtopoconf command can automatically send an event to a remote collection station telling the remote collection station that it should transmit the names of all objects about which it is reporting. An example of using the xnmtopoconf is: xnmtopoconf -add -domain "domainA" -trustname.

In the DIMS, a management station includes a topology replicator that enables the management station to obtain other sets of topology data from other management stations or collection stations in order to derive a global view of the network. The topology replicator is responsible for tracking data from remote topology managers, which are situated within other management stations and collection stations, and merging that data into the local topology database. When the replicator process receives an object from one of the stations, the management station attempts to get the hostname of the object even though the collection station had sent the name as part of the object information (e.g., the "STATION NAME" field).

According to an exemplary embodiment, each collection computer can manage at least one network object. A network object can be, for example, a computer, a router, another collection computer, or any other computer network device. The management computer (e.g., management station 105) can be configured to perform hostname resolution of the network objects that are managed by each collection computer. Alternatively, in accordance with exemplary embodiments, a collection computer (e.g., collection stations 120, 125, 130, and 135) can be configured to perform hostname resolution of the network object that they are managing. Consequently, each collection computer can resolve a network address or hostname of each network object. The resolved network address or hostname can be included in the information that is received at the at least one management computer. In the modified DIMS in accordance with exemplary embodiments of the present invention, using the additional two fields discussed previously, when the replicator process receives an object from a collection station, the management station can determine if the collection station from which the object came is name trustworthy or not. If it is name trustworthy, then the replicator will not try to perform hostname resolution for the hostname for the object, otherwise it will. Performing hostname resolution by the collection computers can prevent management computers from failing because of an inability to resolve hostnames or because of the occurrence of duplicate hostnames.

In the DIMS, based on the information received at a management station, an object can be added by the topology manager to the consolidated network topology maintained within the topology database residing within the management station. In the DIMS, the add object process, for example, verifies the integrity of the object, inserts the object into the network topology database and determines if there is an overlap with another object reported from a collection station or another management station.

As part of the add object process of the DIMS, object identifiers are verified. The process for verifying object identifiers, as modified by exemplary embodiments of the present invention, will be explained with reference to FIG. 4. At step 401, a determination is made as to whether the object has a UUID. If not, then step 401 transfers to step 402, which sets an error indicator, and the subroutine 402 concludes by returning to the add object process. If the object does have a UUID, then step 401 transfers to step 403. At step 403, an inquiry is made as to whether the local object ID has been set for the object. If not, then step 403 transfers to step 404.

In accordance with an exemplary embodiment of the present invention, at step 404, a determination is made as to whether the object has the same attributes (e.g., name, type, physical or link-level address, or subnet mask) in the same management domain as an existing object in the local object ID set. If not, then step 404 transfers to step 405, which allocates a new local object ID for the object. If there is a match, then step 404 transfers to step 406, which sets the local object ID to match the existing object ID. After steps 405, 406, or alternatively, when it is determined that the object has a local object ID at step 403, step 407 is executed. At step 407, a determination is made as to whether the object has a remote object ID. If not, then step 407 transfers to step 408, where a determination is made as to whether the object is locally monitored. If yes, then step 408 transfers to step 409, which sets the remote object ID to the local object ID.

Figure 4:
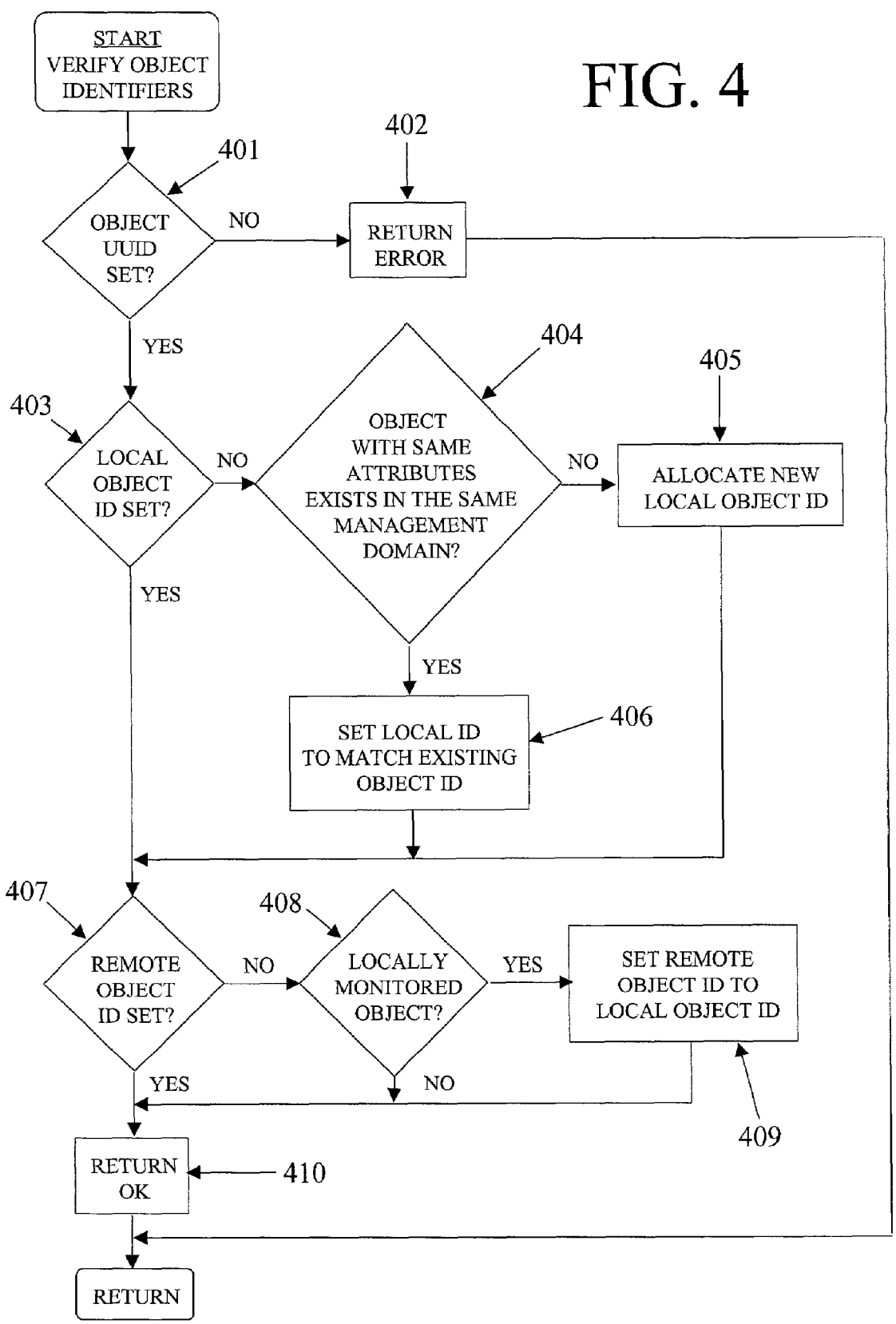
FIG. 4 is a flow chart illustrating an exemplary method that can be used for verifying object identifiers in accordance with an exemplary embodiment of the present invention.
Figure 5:
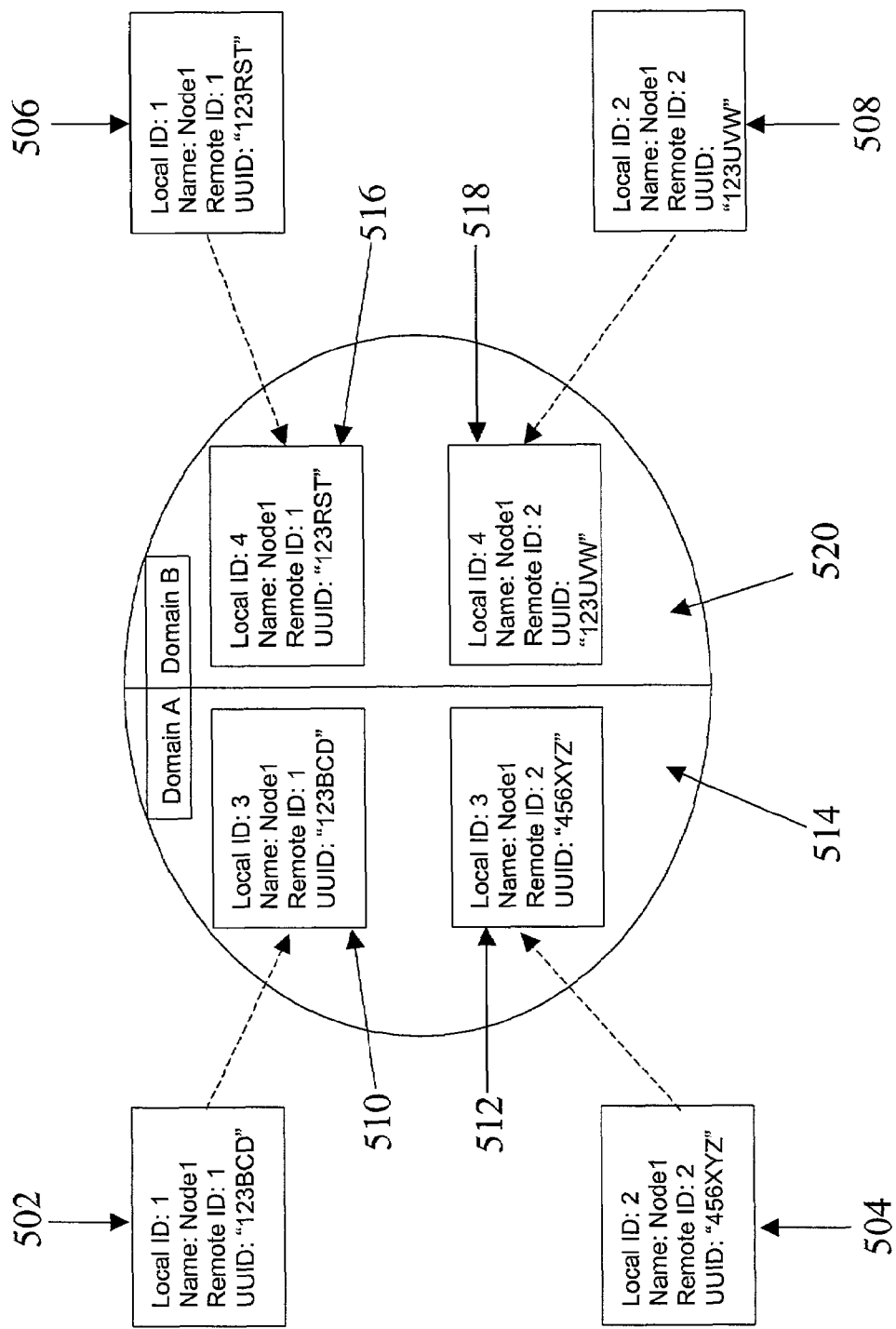
FIG. 5 is a block diagram illustrating identifications that can be accorded to objects in accordance with an exemplary embodiment of the present invention.

The determination performed in step 404 of FIG. 4 will be explained with reference to FIG. 5. In FIG. 5, network object representation 502 is the representation of a network object in a first collection station (e.g., collection station 120 of FIG. 1), network object representation 504 is the representation of a network object in a second collection station (e.g., collection station 125 of FIG. 1), network object representation 506 is the representation of a network object in a third collection station (e.g., collection station 130 of FIG. 1), and network object representation 508 is the representation of a network object in a fourth collection station (e.g., collection station 135 of FIG. 1). Once the network object representations are copied to a management station by the replicator process, internal network object representations 510, 512, 516, and 518 reside within the topology database in the management station.

When an object is copied from a collection station to a management station, the local object ID on the remote collection station is copied into a field in the object called the "remote object ID" at the management station. The remote object ID is tracked by the replicator of the management station and used to communicate with the remote collection station. In addition, the UUID for each object remains the same in both the remote collection station and the management station. In the DIMS, network objects with the same hostname get the same local object ID.

As shown in FIG. 5, in accordance with exemplary embodiments of the present invention, internal network object representations can be separated by management domain. For example, internal network object representations 510 and 512 correspond to management domain 514, while internal network object representations 516 and 518 correspond to management domain 520. Thus, in step 404 of FIG. 4, if the collection stations belong to different management domains and if the collection stations report the same hostname for a network object of the same type for network object representations 502, 504, 506, and 508, then in generating internal network object representations 510, 512, 516, and 518, the management station can assign the same object IDs to network object representations belonging to the same management domain and different object IDs to network object representations belonging to different management domains.

It will be appreciated by those skilled in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method of managing a computer network, comprising the steps of:
    assigning to at least one collection computer a management domain identifier uniquely associated with a management domain in which each collection computer resides;
    receiving, in at least one management computer, information from the at least one collection computer that includes the management domain identifier and a trust flag to indicate a binary setting;
    deciding whether the at least one management computer should resolve a hostname being reported by the at least one collection computer based on the binary setting of the trust flag; and
    maintaining within the at least one management computer a database of the information accessed using the management domain identifier.

2. The method of claim 1, wherein the step of assigning comprises the step of:
    establishing at least one management domain, wherein each management domain includes at least one collection computer.

3. The method of claim 1, wherein the management domain identifier is a domain name of the management domain.

4. The method of claim 1, wherein the information is network topology information.

5. The method of claim 1, wherein the step of receiving comprises the steps of:
    receiving first information from a first collection computer, wherein the first information includes a first network address and a first management domain identifier;
    receiving second information from a second collection computer, wherein the second information includes a second network address and a second management domain identifier, wherein the second network address is identical to the first network address;
    comparing the second network address to the first network address using the second management domain identifier and the first management domain identifier;
    assigning a network element associated with the second network address as a primary network element when the second network address belongs to a different management domain than the first network address; and
    assigning the network element associated with the second network address as a secondary network element when the second network address belongs to a same management domain as the first network address.

6. The method of claim 5, wherein the step of maintaining comprises the step of:
    using management domain identifiers to consolidate network topology information from collection computers having identical network addresses and belonging to different management domains.

7. The method of claim 1, comprising the step of:
    managing, by each collection computer, at least one network object; and
    resolving, by each collection computer, a network address of each network object into a resolved network address included in the information received at the at least one management computer.

8. A system for managing a computer network, comprising:
    a plurality of collection computers, wherein each collection computer is assigned a management domain identifier uniquely associated with a management domain in which each collection computer resides;
    at least one management computer for receiving information, from the plurality of collection computers, that includes the management domain identifier and a trust flag to indicate a binary setting, the at least one management computer being capable of deciding whether to resolve a hostname in the information being reported by the collection computers based on the binary setting of the trust flag; and
    at least one computer database for maintaining within the at least one management computer information accessed using the management domain identifier.

* * * * *